United States Patent
Choi

(10) Patent No.: US 7,972,507 B2
(45) Date of Patent: Jul. 5, 2011

(54) ADVANCED WASTEWATER TREATMENT PROCESS USING UP AND DOWN AEROBIC/ANAEROBIC REACTORS OF CHANNEL TYPE

(76) Inventor: Kwang Hoe Choi, Daejeon (KR)

(*) Notice: Subject to any disclaimer, the term of this patent is extended or adjusted under 35 U.S.C. 154(b) by 52 days.

(21) Appl. No.: 12/529,315

(22) PCT Filed: Feb. 21, 2008

(86) PCT No.: PCT/KR2008/001001
§ 371 (c)(1),
(2), (4) Date: Aug. 31, 2009

(87) PCT Pub. No.: WO2008/108546
PCT Pub. Date: Sep. 12, 2008

(65) Prior Publication Data
US 2010/0101995 A1    Apr. 29, 2010

(30) Foreign Application Priority Data
Mar. 2, 2007 (KR) .............. 10-2007-0022316

(51) Int. Cl.
*C02F 3/30* (2006.01)
(52) U.S. Cl. ............ 210/221.2; 210/605; 210/630
(58) Field of Classification Search .......... 210/603, 210/605, 630, 198.1, 220, 221.1, 221.2
See application file for complete search history.

(56) References Cited

U.S. PATENT DOCUMENTS

| | | | | |
|---|---|---|---|---|
| RE32,429 E | * | 6/1987 | Spector | 210/605 |
| 5,234,595 A | * | 8/1993 | DiGregorio et al. | 210/605 |
| 5,800,709 A | * | 9/1998 | Smith | 210/617 |
| 6,183,643 B1 | * | 2/2001 | Goodley | 210/605 |
| 7,008,538 B2 | * | 3/2006 | Kasparian et al. | 210/610 |

FOREIGN PATENT DOCUMENTS

| | | |
|---|---|---|
| JP | 08-010793 | 1/1996 |
| JP | 2001-327989 | 11/2001 |
| KR | 1020020081175 | 10/2002 |

* cited by examiner

*Primary Examiner* — Fred Prince
(74) *Attorney, Agent, or Firm* — IPLA P.A.; James E. Bame

(57) ABSTRACT

An apparatus for advanced wastewater treatment using up & down aerobic-anaerobic reactors of channel type in the single reaction tank provides the effluent recycle of channel type aeration reactor (internal cycle). For this, the anaerobic reactor of channel type is under the aerobic reactor of channel type in the single reaction tank. And the flow of the wastewater in the single reaction tank is based on the water level difference between inlet and outlet, and the air lift effect of the air diffusers. The partitions of channel type anaerobic reactor and the partitions of channel type aerobic reactor are cross each other. Consequently, the energy cost is cut down because the wastewater flow does not need much pumping energy. And the site need is reduced because of up & down aerobic-anaerobic reactors of channel type in the single reaction tank.

1 Claim, 2 Drawing Sheets

ADVANCED WASTEWATER TREATMENT PROCESS USING UP AND DOWN AEROBIC/ANAEROBIC REACTORS OF CHANNEL TYPE

TECHNICAL FIELD

The invention relates to a wastewater engineering for advanced wastewater treatment.

BACKGROUND ART

The present invention relates to the method for advanced wastewater treatment using up & down aerobic-anaerobic reactors of channel type in the single reaction tank having the effluent recycle of channel type aeration reactor (internal cycle). More particularly, the channel type aeration reactor is composed of the aerobic state and the anoxic state according to the air diffusers.

The removal of nitrogen and phosphorus by using anaerobic and aerobic microorganisms under an anaerobic, an aerobic, and an anoxic condition is accomplished.

Recently, there is a problem that a damage due to the deterioration of water quality condition including an eutrophication, the red tide phenomenon etc, rapidly increases. The advanced wastewater treatment methods, at the same time, for removing the nitrogen and the phosphorus have been very much studied.

Especially, in the denitrification process, the aeration tank for oxidizing the ammonium nitrogen and the anoxic tank for returning the nitrate nitrogen to the nitrogen gas certainly are needed. And the volume of the reactor, in the case of combined removal of nitrogen and phosphorus by biological methods, is very much required because it is necessary to form the anaerobic tank for the phosphorus release and the aeration tank for luxury uptake of phosphorus, and these processes spatially have to be divided.

The most commonly used processes for combined nitrogen and phosphorus removal are the $A^2/O$ process, the five-stage Bardenpho process, the UCT process, and the VIP process. The sequencing batch reactor is also used for the combined nitrogen and phosphorus removal. The $A^2/O$ process is a modification of the A/O process and provides an anoxic zone for denitrification. The disadvantages of $A^2/O$ process are that performance under cold weather operating conditions are uncertain, and the operation is more complex than A/O.

The five-stage Bardenpho process modified the four-stage Bardenpho process for combined nitrogen and phosphorus removal. The staging sequence and recycle method are different from the $A^2/O$ process. The process uses a longer solids retention time than the $A^2/O$ process, which increases the carbon oxidation capability. The disadvantages of the five-stage Bardenpho process are that large internal cycle increases pumping energy and maintenance requirements.

The UCT process, developed at the University of Cape Town, is similar to the $A^2/O$ process with two exceptions. The return activated sludge is recycled to the anoxic stage instead of the aeration stage, and the internal cycle is from the anoxic stage to the anaerobic stage. The disadvantages of the UCT process are that large internal cycle increases pumping energy and maintenance requirements.

The VIP process (named for the Virginia Initiative Plant in Norfolk, Va.) is similar to the $A^2/O$ and UCT processes except for the methods used for recycle systems. The return activated sludge is discharged to the inlet of the anoxic zone along with nitrified recycle from the aerobic zone. The mixed liquor from the anoxic zone is returned to the head end of the anaerobic zone. The disadvantages of the VIP process are that large internal cycle increases pumping energy and maintenance requirements.

The sequencing batch reactor can be operated to achieve of the combined nitrogen and phosphorus removal. The disadvantage of the sequencing batch reactor is suitable only for smaller flows.

DISCLOSURE OF INVENTION

To resolve the disadvantages of background prior art, the construction of invention is that the anaerobic reactor of channel type (20) is under the aerobic reactor of channel type (19) in the single reaction tank having the effluent recycle of channel type aeration reactor (internal cycle) (16). And the flow of the wastewater is based on the water level difference between Inlet (8) and Outlet (9), and the air lift effect of the air diffusers (1) which are arranged in the aerobic reactor of channel type. Consequently, the energy cost is cut down because the wastewater flow does not need much pumping energy. And the site need is reduced because of up & down aerobic-anaerobic reactors of channel type in the single reaction tank.

The upper plate (7) can control the odor components generated around the anaerobic reactor of channel type, and diminish temperature effects under cold weather. The aerobic reactor of channel type (19) is to be set up with the aerobic state channels (11, 12, 13) and anoxic state channels (14, 15) according to air diffusers. This invention system provides anaerobic, anoxic, and aerobic stages for phosphorus, nitrogen, and carbon removal.

The flow steps of wastewater are followed by, <1> Influent (17), <2> Channel type anaerobic reactor inlet (3), <3> Channel type anaerobic reactor outlet (5), <4> Aerobic state channel (11), <5> Anoxic state channel (14), <6> Aerobic state channel (12), <7> Anoxic state channel (15), <8> Aerobic state channel (13), <9> Effluent (18) and Internal cycle by pumping energy (16).

The partitions of channel type anaerobic reactor (4) and the partitions of channel type aerobic reactor (2) are cross each other. The former is crosswise and the latter is lengthwise.

THE DESCRIPTION OF REFERENCE NUMERALS OF THE MAIN ELEMENTS IN DRAWINGS

Figure 1:
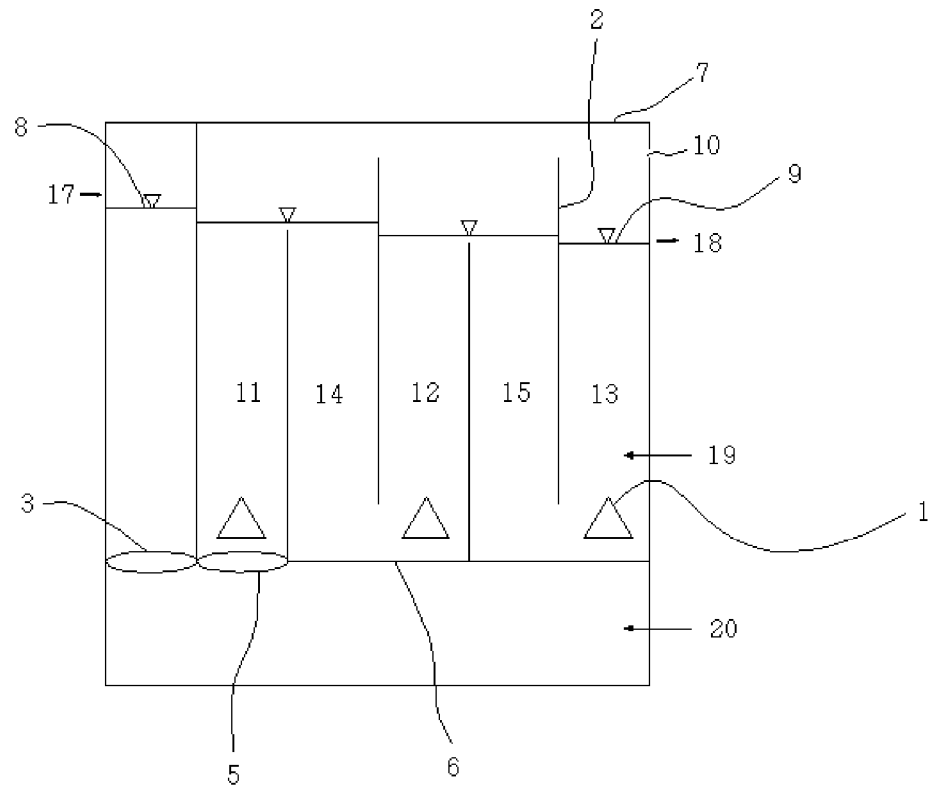
FIG. 1 is a side view of the channel type anaerobic-aerobic reactors.
Figure 2:
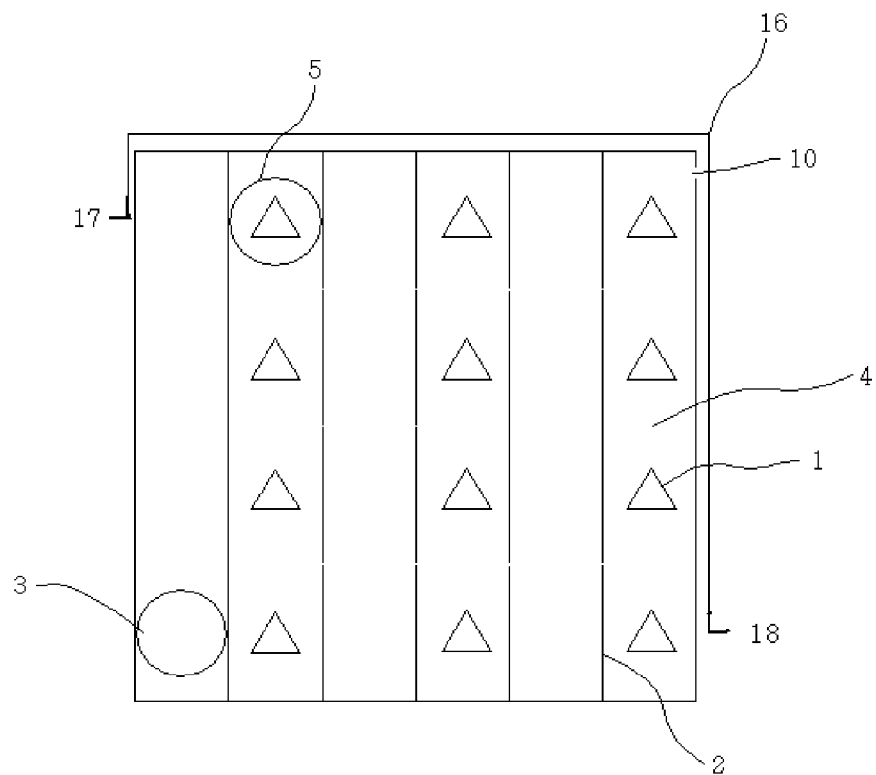
FIG. 2 is a plan view of the channel type aerobic reactor.
Figure 3:
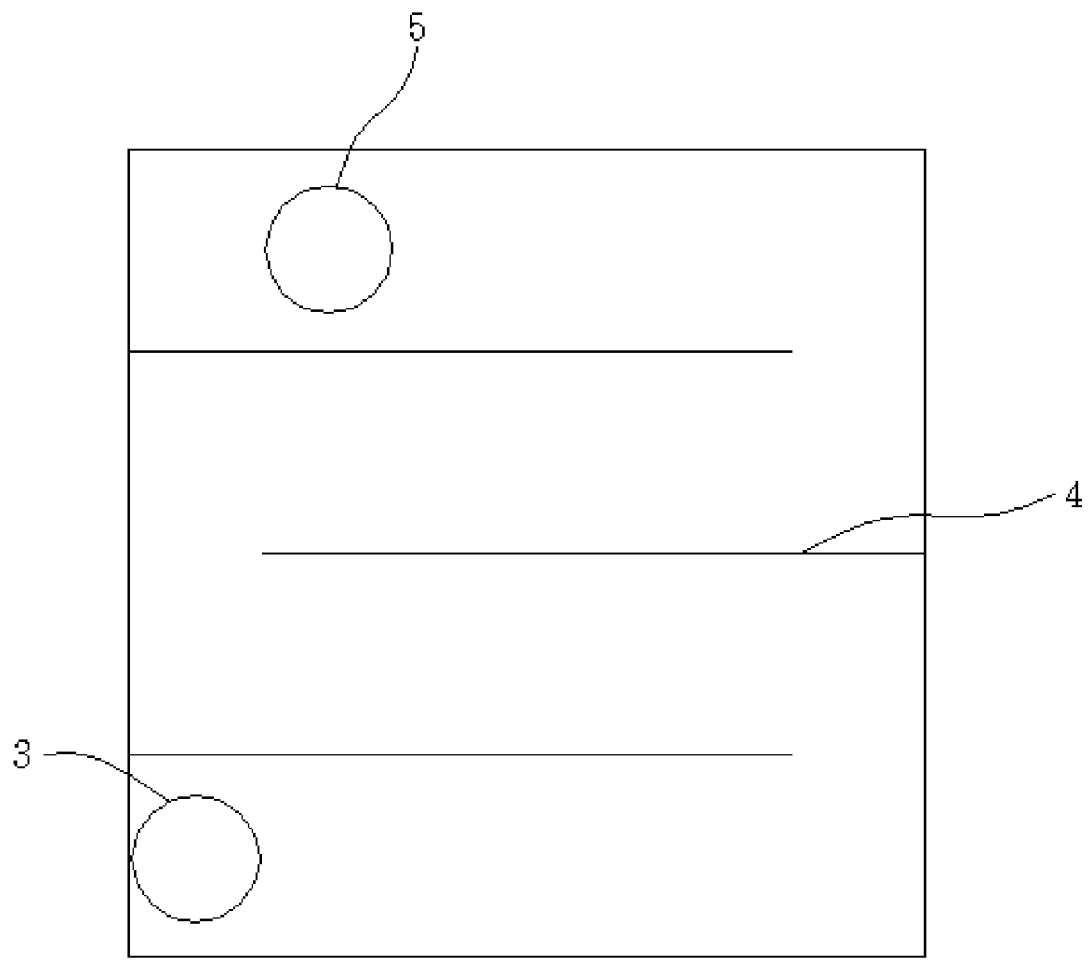
FIG. 3 is a plan view of the channel type anaerobic reactor.

1: air diffuser,
2: partition of channel type aerobic reactor
3: The inlet of channel type anaerobic reactor
4: partition of channel type anaerobic reactor
5: The outlet of channel type anaerobic reactor
6: division partition of channel type anaerobic-aerobic reactors
7: upper plate,
8: water level of inlet,
9: water level of outlet
10: ventilation opening,
11, 12, 13: aerobic state channel
14, 15: anoxic state channel 16: the effluent recycle of channel type aeration reactor (internal cycle)
17: Influent,
18: Effluent
19: The aerobic reactor of channel type
20: The anaerobic reactor of channel type

The invention claimed is:

1. An apparatus for wastewater treatment process using up & down aerobic-anaerobic reactors of channel type comprising:

an anaerobic reactor of channel type (20); comprising a plurality of channels divided by horizontal partitions (4);

an aerobic reactor of channel type (19) provided on top of the anaerobic reactor with a division partition (6) inbetween in a single reaction tank, comprising an Inlet (8), an Outlet (9), and a plurality of aerobic state channels (11, 12, 13), and a plurality of anoxic state channels (14, 15), wherein the aerobic state channels (11, 12, 13) and the anoxic state channels (14, 15) are disposed alternatingly and divided by vertical partitions (2) in the aerobic reactor (19);

an anaerobic reactor inlet (3) connecting between the Inlet (8) and the anaerobic reactor (20);

an anaerobic reactor outlet (5) connecting between the anaerobic reactor (20) and a starting one of the aerobic state channels (11, 12, 13); and a plurality of air diffusers (1) provided in lower portions of the aerobic state channels (11, 12, 13), wherein the flow of the wastewater in the single reaction tank is based on the water level difference between Inlet (8) and Outlet (9), and the air lift effect of the air diffusers (1), wherein the horizontal partitions (4) of the channel type anaerobic reactor (20) and the vertical partitions (2) of channel type aerobic reactor (19) cross each other at the division partition (6), wherein the aerobic reactor (19) comprises the aerobic state channels (11, 12, 13) with the air diffusers (1) and the anoxic state channels (14, 15) without air diffusers, wherein the single reaction tank has the effluent recycle of channel type aeration reactor (internal cycle) by pumping energy (16).

* * * * *